United States Patent
Kikuta et al.

(10) Patent No.: US 8,974,754 B2
(45) Date of Patent: Mar. 10, 2015

(54) METHOD FOR PRODUCING NICKEL-CONTAINING ACID SOLUTION

(75) Inventors: Naoko Kikuta, Ehime (JP); Satoshi Asano, Ehime (JP); Masatoshi Takano, Ehime (JP)

(73) Assignee: Sumitomo Metal Mining Co. Ltd. (JP)

( * ) Notice: Subject to any disclaimer, the term of this patent is extended or adjusted under 35 U.S.C. 154(b) by 0 days.

(21) Appl. No.: 13/816,954

(22) PCT Filed: Nov. 22, 2011

(86) PCT No.: PCT/JP2011/076919
§ 371 (c)(1),
(2), (4) Date: Jul. 2, 2014

(87) PCT Pub. No.: WO2013/076812
PCT Pub. Date: May 30, 2013

(65) Prior Publication Data
US 2014/0308183 A1    Oct. 16, 2014

(30) Foreign Application Priority Data
Aug. 3, 2010 (JP) ................................ 2010-174906

(51) Int. Cl.
C22B 3/00 (2006.01)
H01M 10/54 (2006.01)
H01M 4/32 (2006.01)
H01M 10/34 (2006.01)

(52) U.S. Cl.
CPC ............... *H01M 10/54* (2013.01); *H01M 4/32* (2013.01); *H01M 10/345* (2013.01)
USPC ..................................... 423/140; 423/150.1

(58) Field of Classification Search
USPC ............................................... 423/140, 150.1
See application file for complete search history.

(56) References Cited

U.S. PATENT DOCUMENTS 5,858,061 A    1/1999    Kleinsorgen et al.

FOREIGN PATENT DOCUMENTS

| JP | S50-092205 | 7/1975 |
|----|-----------|--------|
| JP | 8-115752  | 5/1996 |
| JP | 2002-198103 | 7/2002 |
| JP | 2003-036894 | 2/2003 |

(Continued)

OTHER PUBLICATIONS

Written Opinion of the International Searching Authority of Feb. 14, 2012.

*Primary Examiner* — Steven Bos
(74) *Attorney, Agent, or Firm* — Gerald E. Hespos; Michael J. Porco; Matthew T. Hespos

(57) ABSTRACT

The method for obtaining an acid solution containing nickel is obtained by treating a positive electrode material of a nickel-metal hydride battery. The method includes a water-washing step, wherein a positive electrode material of a nickel-metal hydride battery is water-washed by adding water, and then separated to form a positive electrode material after water-washing and a water-washed slurry. An acid-washing step then is performed, wherein an acid is added and mixed into the positive electrode material obtained after water-washing in the water-washing step, and, separation is performed to form a positive electrode material after acid-washing and an acid-washed slurry. A dissolution step is performed wherein the positive electrode material obtained in the acid-washing step is separated into a nickel solution and a dissolution residue by adding any one of an acid and an oxidizing agent.

3 Claims, 1 Drawing Sheet

(56) References Cited

FOREIGN PATENT DOCUMENTS

| | | |
|---|---|---|
| JP | 3918041 | 2/2007 |
| JP | 2003-203680 | 4/2008 |
| JP | 2002-226923 | 2/2010 |
| JP | 2010-037626 | 2/2010 |
| JP | 2010-126779 | 6/2010 |
| JP | 2010-174366 | 8/2010 |
| WO | 2012/011205 | 1/2012 |

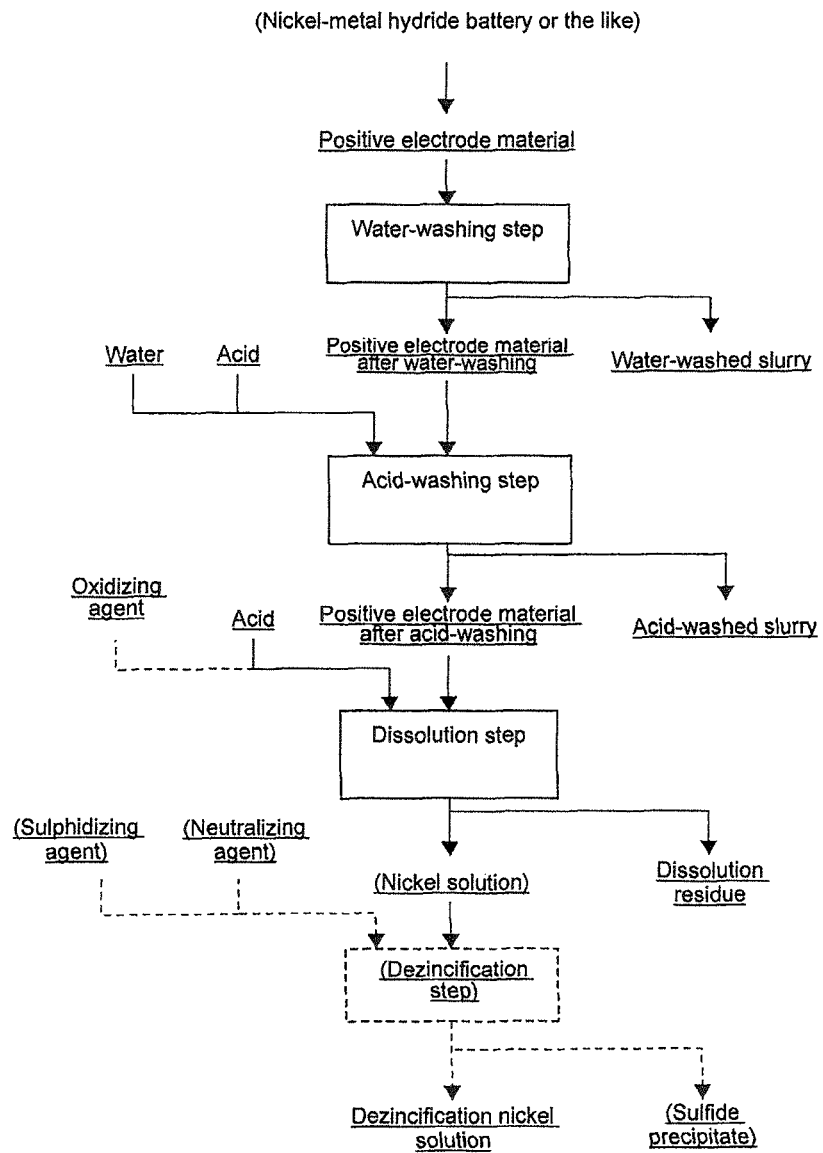

METHOD FOR PRODUCING NICKEL-CONTAINING ACID SOLUTION

BACKGROUND OF THE INVENTION

1. Field of the Invention

The present invention relates to a method for obtaining an acid solution containing nickel from a positive electrode material constituting a nickel-metal hydride battery and using a foamed nickel plate (Celmet).

2. Description of the Related Art

In recent years, environmental problems, such as acid rain attributable to acid gas of nitrogen oxide, sulfur oxide, or the like, which is emitted into the air, and global warming due to carbon dioxide gas, have been highlighted as global problems. In order to reduce contamination by exhaust gas of automobiles, one of the causes, hybrid vehicles equipped with a secondary battery such as a nickel-metal hydride battery have been attracting attention.

This nickel-metal hydride battery comprises a positive electrode, a negative electrode, an electrode terminal, and an electrolyte, as functional members, and furthermore comprises an electrode substrate, a separator disposed between positive and negative electrodes, and a case for housing these members, as structural members.

Here, each of the members comprises various materials and components such that a positive electrode active material is made of nickel hydroxide containing additional trace elements; a negative electrode active material is made of a hydrogen storage alloy containing nickel, cobalt, rare earth elements (misch metal), or the like; the electrode substrate is made of a nickel plate, a nickel-plated iron plate, or the like; the separator is made of plastics; the electrolyte is made of a potassium hydroxide solution; the electrode terminal material is made of metal such as copper, iron, or the like; and the case is made of plastics, steel, or the like.

As a structure of the nickel-metal hydride battery, an electrode body is configured such that positive electrodes and negative electrodes are alternately layered, with disposing plastics between each of the positive and negative electrodes as separators. This electrode body is placed into a case made of plastics or steel, and the electrodes and the case are connected with the electrode terminal materials made of metal, such as copper or iron, and finally an electrolyte containing a potassium hydroxide solution as a main component is filled between the electrodes, and the case is sealed.

There is a positive electrode substrate of the nickel-metal hydride battery, called Celmet, which has a structure configured that a collector is formed by using foamed nickel as a base material, and a positive active material is press-fitted therein and pressure molding is performed. Celmet has a feature that enables electrodes to be produced relatively easily and to have a high capacity more easily, and has been used widely.

A nickel-metal hydride battery installed in hybrid vehicles are replaced with new one when deteriorating with use, or removed when vehicles are scrapped, thereby becoming a spent nickel-metal hydride battery. In addition, a waste material which is not commercialized, such as a defective product and a trial product, generates in a manufacturing process of nickel-metal hydride batteries.

The spent nickel-metal hydride battery and the waste material (hereinafter, collectively referred to as a nickel-metal hydride battery or the like) contains many kinds of rare and valuable metals, such as nickel, cobalt, and rare earth elements, and therefore recovering and reusing these valuable metals have been attempted.

However, nickel-metal hydride batteries have a complex and solid structure, and furthermore, comprise materials many of which are chemically stable. Therefore, it was not easy that metals contained in a nickel-metal hydride battery or the like, such as nickel, cobalt, and rare earth elements, were separated and recovered to be reused as materials for new batteries.

Therefore, as a measure to solve the problem, for example, there has been proposed a method for recovering a metal from a nickel-metal hydride battery or the like, the method wherein a nickel-metal hydride battery or the like is placed into a furnace to be melted, and plastics constituting the battery are combusted to be removed, and furthermore, most of iron is made into slag to be removed, then nickel is reduced and recovered as ferronickel in which a part of iron is alloyed.

This method has a feature of little investment and less time and effort for treatment, such as a easiness to utilize existing smelting works and existing refining equipment. However, the recovered ferronickel also contains a large amount of impurity elements and is not suitable for any use other than a stainless raw material. In addition, most of cobalt and rare earth elements are distributed into slag and discarded to the outside of a system, and accordingly are not usable effectively, hence this method is not desirable.

As referred in Japanese Patent Publication No. 3918041, there has been proposed a method for recovering a metal from a spent nickel-metal hydride storage battery, the method comprising the steps of: forming an aqueous phase by dissolving a storage battery scrap with acid; separating rare earth metals from the aqueous phase as a double sulfate; then precipitating iron from the aqueous phase by raising pH; performing liquid-liquid extraction of a filtrate obtained after the iron precipitation by using an organic extractant to separate zinc, cadmium, manganese, aluminum, and residual iron and rare earth elements, wherein the extractant and the pH value is selected so that, after the extraction, substantially only nickel and cobalt are dissolved into the aqueous phase and remain at the same atomic ratio as at the time of having existed inside the storage battery scrap; then, precipitating a nickel or cobalt alloy from the aqueous phase; and finally using the nickel/cobalt alloy as a master alloy in order to produce a hydrogen storage alloy.

However, in this method, it is not easy that nickel and cobalt are electrodeposited as an alloy so as to have exactly the same ratio as in battery composition, and there is a possibility that, depending on solution composition and electrolytic condition, electrodeposited alloy composition might change. Therefore, in order to accomplish an exact alloy composition, it takes extra time and effort to analyze an obtained alloy each time, and then to add and redissolve an insufficient component in a required amount.

Furthermore, it is known that battery characteristics change depending on alloy composition, and the alloy composition is kept changed and improved by such as adding a new component in order to improve performance of a battery, and therefore, a recovered nickel alloy and a recovered cobalt alloy were not necessarily reusable as they were.

In addition, when a nickel-metal hydride battery or the like is leached as it is by using an acid, or an acid and an oxidizing agent, a large amount of the acid or the oxidizing agent is consumed only for neutralizing potassium hydroxide, which is an electrolyte component. Note that, when sulfuric acid is used for leaching, a double sulfate of potassium originating in the electrolyte and a rare earth element contained in an electrode active material generates and precipitates, whereby the rare earth element could become a loss.

Furthermore, in this method, by setting a magnetic fraction step, performed is a treatment wherein trivalent iron ions contained in a leachate are recovered to divalent iron ions by using metallic iron. However, since a large amount of sulfuric acid exists in the leachate, there is a possibility that more than an equivalent of iron to recover trivalent iron ions dissolves excessively, whereby an iron concentration in the leachate increases excessively.

Therefore, there has been a problem that an amount of a neutralizing agent used and an amount of precipitate generated in a deferrization step increase, whereby cost is raised, and nickel which simultaneously coprecipitates with iron to become a loss increases.

Hence, there has been sought a method for efficiently obtaining a solution containing nickel and cobalt from a positive electrode material of a spent nickel-metal hydride battery or the like.

The present invention provides a production method for obtaining a solution with a high content of nickel and cobalt by more simply and more efficiently separating nickel and cobalt from a positive electrode material, a production waste material, or the like, of a spent nickel-metal hydride battery.

SUMMARY OF THE INVENTION

A first aspect of the present invention to solve the problem provides a method for producing a nickel-containing acid solution, wherein an acid solution containing nickel is obtained by treating a positive electrode material of a nickel-metal hydride battery through the following steps shown in (1) to (3): a water-washing step wherein a positive electrode material of a nickel-metal hydride battery is water-washed by adding water, and then separated to form a positive electrode material after water-washing and a water-washed slurry; (2) an acid-washing step wherein an acid is added and mixed into the positive electrode material after water-washing which has been obtained in the water-washing step, and, with pH maintained in a range of not less than 0.0 and not more than 3.5, separation is performed to form a positive electrode material after acid-washing and an acid-washed slurry; and (3) a dissolution step wherein the positive electrode material after acid-washing which has been obtained in the acid-washing step is separated into a nickel solution and a dissolution residue by adding both an acid and an oxidizing agent, or any one of an acid and an oxidizing agent.

A second aspect of the present invention provides the method for producing a nickel-containing acid solution, wherein an alkali is added to the nickel solution formed in the dissolution step of the first aspect to adjust and maintain pH in a range of not less than 2.0 and not more than 2.5, and then an alkali sulfide or a hydrogen sulfide is added to separate into a dezincification nickel solution and a sulfide precipitate, and the dezincification nickel solution obtained is an acid solution containing nickel.

A third aspect of the present invention provides the method for producing a nickel-containing acid solution, wherein, in the first aspect and the second aspect, when only an acid is added in the dissolution step, the acid is sulfuric acid or hydrochloric acid; when only an oxidizing agent is added, the oxidizing agent is halogen; and when both an acid and an oxidizing agent are added, air is used as the oxidizing agent when sulfuric acid is used as the acid, or chlorine is used as the oxidizing agent when hydrochloric acid is used as the acid.

According to the present invention, a solution with a high content of nickel is obtainable easily and at low cost from a positive electrode material constituting a nickel-metal hydride battery, without using a special process and chemicals, and therefore reuse as a material for batteries is made possible and industrially remarkable effects are achieved.

BRIEF DESCRIPTION OF DRAWINGS

FIG. 1 shows a production process in the present invention for forming a nickel solution from a positive electrode material of a nickel-metal hydride battery, or the like.

DETAILED DESCRIPTION OF THE PREFERRED EMBODIMENTS

Hereinafter, a method of the present invention for obtaining a nickel solution from a positive electrode material of a nickel-metal hydride battery or the like will be described.

The present invention provides a method for recovering nickel efficiently from a positive electrode material which is separated and recovered by disassembling a spent nickel-metal hydride battery (hereinafter, referred to as a nickel-metal hydride battery), or from a positive electrode material of a defective product generating in a manufacturing process. The positive electrode material has a structure configured such that foamed nickel metal is used as a base material, and nickel hydroxide containing some quantity of additive components is applied to a surface thereof.

Then, collected positive electrode materials are water-washed (water-washing step), and then acid-washed by a low concentration of an acid solution (acid-washing step), followed by leaching treatment using a high concentration of an acid or an oxidizing agent, or using both the acid and the oxidizing agent (dissolution step), whereby an aqueous solution containing nickel is obtained. The positive electrode material also includes cobalt, and accordingly cobalt is also contained in the solution. Therefore, next, a known treatment, such as solvent extraction, is performed to separate nickel from cobalt, and furthermore to separate from other elements remaining, whereby finally a high-purity nickel solution is obtained. This nickel solution is usable as a raw material for producing a new battery material.

Note that a nickel-metal hydride battery or the like sometimes contains zinc, and if the zinc becomes a problem at a downstream step, a treatment may be performed in such manner that an alkali is added to the obtained solution to adjust pH, and then a sulphidizing agent is added thereto to separate zinc as a sulfide.

The present invention provides a production method in which a treatment is performed in accordance with a process chart shown in FIG. 1, and hereinafter, the outline will be described.

(1) Water-Washing Step:

This step is a water-washing treatment, wherein a positive electrode material of a nickel-metal hydride battery is water-washed to remove a negative electrode active material and an electrolyte component each of which adheres to the positive electrode material, and thereby to obtain a positive electrode material after water-washing and a water-washed slurry.

(2) Acid-Washing Step:

This step is an acid-washing treatment, wherein the positive electrode material after water-washing obtained in the washing step is washed using a dilute acid to remove a negative electrode active material which adheres firmly to the positive electrode material after water-washing, and thereby to obtain a positive electrode material after acid-washing and an acid-washed slurry.

(3) Dissolution Step:

This step is a leaching treatment, wherein the positive electrode material after acid-washing obtained in the acid-washing step is washed by any one of washing by an acid (Particularly, sulfuric acid is preferable.), washing by an oxidizing agent (Halogen, such as chlorine and bromine, is preferable.), and washing by both an acid and an oxidizing agent, to leach nickel from the positive electrode material after acid-washing into a sulfuric acid solution. Note that, when both an acid and an oxidizing agent are used, chlorine may be suitably used as the oxidizing agent when hydrochloric acid is used as the acid, or an oxidizing agent other than halogen (air, ozone, hydrogen peroxide, or the like. Particularly, air is preferable.) may be used when sulfuric acid is used as the acid.

According to the present invention, a nickel-containing solution is formed through the above-mentioned three steps, and each of the steps will be further described in detail.

First, before performing the above-mentioned three steps, a pre-treatment step is carried out by the following method, if needed.

[Pre-Treatment Step]

When the positive electrode material to be treated according to the present invention is obtained from a spent nickel-metal hydride battery, it is necessary to disassemble the battery prior to applying the water-washing step of the present invention. In this case, a pre-treatment step needs to be included, wherein a spent nickel-metal hydride battery is roasted under an inert atmosphere to deactivate the spent nickel-metal hydride battery, and at the same time, a nickel oxide, which does not react with a low concentration of an acid or an oxidizing agent as it is, is recovered, and then, disassembly and separation are performed to prepare the positive electrode material.

In this disassembly and separation, from a viewpoint of washing efficiency or handling, the positive electrode material is not desirably shredded and crushed more than needed, and preferably has an angular shape with a side length of approximately 1 to 5 cm.

An alkaline electrolyte also adheres to the positive electrode material which is taken out from a spent nickel-metal hydride battery. If alkali metal ions in this electrolyte remain in the positive electrode material, when leaching is performed with a sulfuric acid, or an acid or an oxidizing agent solution each of which contains sulfate ions, a double sulfate of rare earth which is hard to dissolve in water is formed. Due to the formation, dissolution of nickel and cobalt is also controlled, and therefore it is desirable that an amount of the remaining alkali metal is decreased to not more than 1%.

[Water-Washing Step]

As a washer to be used in a water-washing step, a washing method which is capable of washing with rolling the positive electrode material, such as a drum stirrer, is preferably used since removal efficiency of the adhering negative electrode active material increases.

A water-washed slurry recovered in this water-washing step contains a negative electrode active material, a positive electrode splinter, and a positive electrode active material, each being suspended, and therefore these may be filtered and recovered, then charged into special equipment which is capable of treating a mixture of the negative electrode active material and the positive electrode active material as it is to perform a treatment.

[Acid-Washing Step]

In an acid-washing step, while water and a dilute acid solution are added to a positive electrode material after water-washing and stirred, pH is adjusted between 0.0 and 3.5. During the acid-washing, the positive electrode material is made to roll or flow by stirring. With the acid-washing, negative electrode active material powders which are suspended in an acid-washing solution liberate, and therefore, while being separated and removed suitably, the negative electrode active material powders may continue to be acid-washed.

As a dilute acid solution to be used, dilute hydrochloric acid, dilute sulfuric acid, or the like is used. The pH not more than 0.0 is not preferable since a positive electrode plate itself dissolves with impurities and becomes a loss, on the other hand, the pH more than 3.5 is not preferable since removal efficiency of impurities remarkably decreases.

[Dissolution Step]

In a dissolution step, an acid, an oxidizing agent, or an aqueous solution of both an acid and an oxidizing agent is added to an acid-washed positive electrode material obtained in the acid-washing step (a positive electrode material after acid-washing), whereby nickel is leached from the positive electrode material into a sulfuric acid solution.

In view of nickel solubility, reaction rate, and economical efficiency, a hydrochloric acid solution or a sulfuric acid solution is usable as the acid to be used. Also, in view of nickel solubility, reaction rate, and economical efficiency, chlorine is preferable as the oxidizing agent.

Furthermore, when a nickel-containing acid solution obtained in the leaching treatment is used as a raw material of a battery material, generally, sulfuric acid is desirably used as the acid to be used in the dissolution step, and the sulfuric acid concentration is desirably approximately 100 g/l to 200 g/l. With the leaching treatment progressing, sulfuric acid is reduced and therefore suitably added during a reaction to maintain the desirable concentration range.

It is more desirable to perform heating to a temperature of not less than 60 degrees C., further preferably not less than 80 degrees C. and not more than 95 degrees C., because a reaction accordingly progresses efficiently.

In the dissolution step, when dissolution is carried out not only by an acid, but occasionally by using an acid and an oxidizing agent in combination, the dissolution can be progressed effectively. In the dissolution by sulfuric acid, if contamination of a chlorine oxidizing agent is not desired, for example, air, oxygen, hydrogen peroxide, ozone, or the like is usable as the oxidizing agent.

[Dezincification Step]

Note that, when the nickel solution obtained in the above-mentioned step contains a large amount of zinc, a nickel solution or a product obtained from the nickel solution, such as a nickel compound or a nickel metal, is not capable of being produced, and therefore the zinc needs to be separated.

Therefore, in the present invention, when the solution contains zinc beyond a tolerance limit, there may be adopted a method in which the solution obtained in the dissolution step is sulfurized by addition of a sulphidizing agent to separate and remove zinc as a sulfide precipitate.

Note that a neutralizing agent is preferably added before adding a sulphidizing agent to maintain pH in a range of 2.0 to 2.5. This is because, when the pH is not more than 2.0, sulfuration reaction of zinc, which is a target to be recovered, is insufficient and the purpose of zinc removal cannot be achieved, on the other hand, when the pH is not less than 2.5, sulfuration and precipitation reaction of nickel, which is a target to be recovered, progress and a loss is caused.

Although various kinds of agents can be used as the neutralizing agent to be added, it is often the case that coexistence of alkali metal is not desired in many uses, and therefore nickel hydroxide or nickel carbonate, each being a nickel compound with neutralizing ability, is suitable.

Although various kinds of agents, such as hydrogen sulfide gas, sodium sulfide, and sodium hydrogensulfide, can be used as the sulphidizing agent, when alkali metal is not desired, hydrogen sulfide is most suitable.

As a target nickel-containing solution, a dezincification nickel solution which is obtained after separation of contained zinc as a sulfide precipitate by adding a sulphidizing agent is given a separation treatment of nickel from cobalt and an impurity removal treatment, and thereby is usable as a raw material of a battery material.

EXAMPLE

The present invention will be described in more detail hereinafter with reference to examples of the present invention.

Metal components were analyzed using ICP emission analysis.

Example 1

A residual electric charge was deactivated by reduction roasting in advance, and at the same time, a spent nickel-metal hydride battery in which nickel and cobalt were reduced to a metal state was disassembled and separated, and a positive electrode material as taken out. Next, the positive electrode material was cut into cut pieces by using a cutting machine so that the side length was within a range of 1 to 5 cm, and 1 kg of the positive electrode material already roasted was prepared and used in the following steps. Note that the deactivation treatment of a battery residual charge by reduction roasting was carried out in such manner that a spent nickel-metal hydride battery was charged into an electric furnace, and, while nitrogen gas was flown to create an inert atmosphere, a temperature of 550 degrees C. was maintained, and reduction roasting was performed for one hour.

(1) Water-Washing Step

To 1 kg of the positive electrode material already roasted, 10 liters of water were added and stirred at a room temperature for 60 minutes to perform water-washing. After the water-washing, a positive electrode material after water-washing was separated from a solution after water-washing (a water-washed slurry) by using a sieve with a sieve opening of 1 mm, and the positive electrode material after water-washing was dried using a vacuum dryer. An amount of the positive electrode material after water-washing was 0.96 kg after the drying.

(2) Acid-Washing Step

To the positive electrode material after water-washing obtained in the water-washing step, 10 liters of water were added and stirred to form a slurry. Next, while sulfuric acid was added to adjust so that a pH of the slurry was maintained at 3.5, stirring was performed for 60 minutes. After the elapse of a predetermined time period, filtering was performed using a sieve with a sieve opening of 1 mm to separate into a positive electrode material after acid-washing and an acid-washed slurry. The separated positive electrode material after acid-washing was dried using a vacuum dryer to obtain the positive electrode material after acid-washing having a weight of 0.83 kg.

(3) Dissolution Step

The positive electrode material after acid-washing obtained in the acid-washing step was charged into a leaching bath having a capacity of 15 liters, and 8.0 liters of sulfuric acid aqueous solution having a concentration of 17% by weight were added, and, while a solution temperature was maintained at 80 degrees C., air was blown at a flow rate of 1 liter per minute as an oxidizing agent. After stirring for 8 hours in this state, filtering was performed to obtain a nickel solution A.

Table 1 shows analysis values of the nickel solution A. It is confirmed that nickel and cobalt are capable of being selectively separated from a rare earth component, and the like.

Example 2

The nickel solution A obtained in Example 1 had a Zn concentration in the solution of 1.1 [g/L], and therefore a dezincification step shown below was carried out.

(4) Dezincification Step

Into a dezincification bath having a capacity of 2 liters, 1 liter of the obtained nickel solution A was poured. Hydrogen sulfide gas was blown into the dezincification bath at a flow rate of 0.3 g/min, and at that moment, nickel carbonate was added so that a pH of a generated slurry was maintained within a range of 2.0 to 2.5.

Stirring further continued for 10 minutes in this state to promote a reaction. After completion of the reaction, contents in the dezincification bath were filtered to separate into a solution and a sulfide precipitate, whereby a dezincification nickel solution A was obtained. Table 1 shows component analysis results. As shown in Table 1, compared with the nickel solution A, contained zinc is reduced from Ni/Zn=82 to 890, that is, to approximately one-tenth.

Example 3

Under the same conditions and operation as in (1) the water-washing step of Example 1, 1.1 kg of already-roasted positive electrode material equivalent to one in Example 1 were water-washed, separated, and dried to obtain a positive electrode material after water-washing having a weight after drying of 0.97 kg. Then, under the same conditions and operation as in (2) the acid-washing step of Example 1, the positive electrode material after water-washing was acid-washed, separated, and dried to obtain a positive electrode material after acid-washing having a weight after drying of 0.94 kg.

Furthermore, the positive electrode material after acid-washing was charged into a leaching bath having a capacity of 15 liters, and 8.0 liters of water were added thereto, and then, while a solution temperature was maintained at 70 degrees C., chlorine gas was blown from a cylinder at a flow rate of 1 liter per minute as an oxidizing agent. After stirring for 8 hours in this state, the blowing of chlorine gas was stopped and filtering was performed to obtain a nickel solution D.

Analysis values of the nickel solution D were Ni: 91 g/L, Co: 3.6 g/L, Fe: 0.03 g/L, Zn: 1.2 g/L, La: <0.01 g/L, and K: 0.06 g/L, and it was confirmed that leaching was able to be performed also by blowing chlorine gas, as is the case of leaching using sulfuric acid.

Comparative Example 1

0.8 kg of already-roasted positive electrode material which was the same as in Example 1 were further prepared. This material was charged into a leaching bath by the same operation as in the dissolution step of Example 1, and leached under the same conditions and operation to obtain a nickel solution B. Table 1 shows the analysis results. It is understood that, as a result, potassium, zinc, rare earth, or the like is more eluted in this nickel leaching treatment.

Comparative Example 2

1.0 kg of already-roasted positive electrode material which was the same as in Example 1 was further prepared, and water-washed and separated under the same conditions and operation as in (1) the water-washing step of Example 1, whereby a positive electrode material after water-washing having a dry weight of 0.94 kg was obtained. The positive electrode material after water-washing was charged into a leaching bath by the same way as in (3) the leaching step of Example 1, and leached under the same conditions and operation to obtain a nickel solution C. Table 1 shows the analysis results.

Compared with Comparative Example 1, by the water-washing alone, a potassium concentration was reduced, but other impurity elements were difficult to be removed.

TABLE 1

| | Solution Type | Water-washing step | Acid-washing step | Dissolution step | Dezincification step | Ni | Co | Fe | Zn | La | K |
|---|---|---|---|---|---|---|---|---|---|---|---|
| Example 1 | Nickel solution A | ○ | ○ | ○ | X | 90 | 3.6 | 0.02 | 1.1 | <0.01 | 0.05 |
| Example 2 | Dezincification nickel solution A | ○ | ○ | ○ | ○ | 89 | 3.4 | 0.02 | 0.1 | <0.01 | 0.05 |
| Example 3 | Nickel solution D | ○ | ○ | ○ | X | 91 | 3.6 | 0.03 | 1.2 | <0.01 | 0.06 |
| Comparative Example 1 | Nickel solution B | X | X | ○ | X | 82 | 5.5 | 0.06 | 2.4 | 0.19 | 0.15 |
| Comparative Example 2 | Nickel solution C | ○ | X | ○ | X | 85 | 5.3 | 0.05 | 2.3 | 0.16 | 0.07 |

Step performed for positive electrode material. Element concentration in nickel solution [g/L].

○ = Performed
X = Not Performed

The invention claimed is:

1. A method for producing a nickel-containing acid solution, comprising:
   providing a positive electrode material of a nickel-metal hydride battery, the positive electrode material comprising a base material of a nickel metal and a nickel hydroxide that is applied to a surface of the base material;
   performing a water-washing step by adding water to the positive electrode material of a nickel-metal hydride battery to obtain a positive electrode material after water-washing and a water-washed slurry;
   performing an acid-washing step by adding and mixing an acid into the positive electrode material after the water-washing step, and performing a separation with a pH maintained in a range of not less than 0.0 and not more than 3.5 to form a positive electrode material after acid-washing and an acid-washed slurry;
   performing a dissolution step selected from: (a) a step of adding the positive electrode material after acid-washing to an acid solution to obtain a nickel solution and a dissolution residue; (b) a step of adding the positive electrode material after acid-washing to an acid solution, and adding an oxidizing agent therein to obtain a nickel solution and a dissolution residue; or (c) a step of adding the positive electrode material after acid-washing to water, and adding an oxidizing agent therein to obtain a nickel solution and a dissolution residue; and
   adding an alkali to the nickel solution to adjust and maintain pH in a range of not less than 2.0 and not more than 2.5, and adding an alkali sulfide or an hydrogen sulfide thereto to obtain dezinced nickel solution and a sulfide precipitate.

2. The method for producing a nickel-containing acid solution according to claim 1, wherein,
   in the dissolution step,
   when only an acid is used, the acid is sulfuric acid or hydrochloric acid,
   when only an oxidizing agent is added, the oxidizing agent is halogen, and
   when both an acid and an oxidizing agent are used, air is used as the oxidizing agent when sulfuric acid is used as the acid, or chlorine is used as the oxidizing agent when hydrochloric acid is used as the acid.

3. A method for producing a nickel-containing acid solution, comprising the steps of:
   providing a positive electrode material comprised of a base material of a nickel metal and a nickel hydroxide that is applied to a surface of the base material:
   performing a water-washing step by adding water to the positive electrode material to obtain a positive electrode material after water-washing and a water-washed slurry;
   performing an acid-washing step by adding and mixing an acid into the positive electrode material after the water-washing step, and performing a separation with a pH maintained in a range of not less than 0.0 and not more than 3.5 to form a positive electrode material after acid-washing and an acid-washed slurry; and
   performing a dissolution step by adding the positive electrode material that has been obtained in the acid-washing step to water, and then adding a halogen therein as an oxidizing agent to obtain a nickel solution and a dissolution residue.

* * * * *